United States Patent
Olsson

(10) Patent No.: US 9,387,423 B2
(45) Date of Patent: Jul. 12, 2016

(54) REACTOR, METHOD OF DECREASING THE AMOUNT OF SOLID PARTICLES IN A GAS STREAM FROM A REACTOR AND USE OF THE REACTOR

(71) Applicant: Cassandra Oil Technology AB, Västerås (SE)

(72) Inventor: Anders Olsson, Surrey Surrey (GB)

(73) Assignee: Cassandra Oil Technology AB, Västerås (SE)

( * ) Notice: Subject to any disclaimer, the term of this patent is extended or adjusted under 35 U.S.C. 154(b) by 0 days.

(21) Appl. No.: 14/653,416

(22) PCT Filed: Dec. 17, 2013

(86) PCT No.: PCT/SE2013/051543
§ 371 (c)(1),
(2) Date: Jun. 18, 2015

(87) PCT Pub. No.: WO2014/098747
PCT Pub. Date: Jun. 26, 2014

(65) Prior Publication Data
US 2015/0343357 A1     Dec. 3, 2015

Related U.S. Application Data

(60) Provisional application No. 61/740,815, filed on Dec. 21, 2012.

(30) Foreign Application Priority Data

Dec. 21, 2012 (SE) ...................................... 1251493

(51) Int. Cl.
| | |
|---|---|
| *B01J 19/00* | (2006.01) |
| *B01J 19/18* | (2006.01) |
| *B01D 45/00* | (2006.01) |
| *B01D 45/12* | (2006.01) |
| *B01D 45/14* | (2006.01) |
| *B09B 3/00* | (2006.01) |
| *C10J 3/00* | (2006.01) |
| *C10J 3/42* | (2006.01) |

(Continued)

(52) U.S. Cl.
CPC ................. *B01D 45/14* (2013.01); *B01J 19/18* (2013.01); *B01J 19/1806* (2013.01); *B02C 13/04* (2013.01);

(Continued)

(58) Field of Classification Search
CPC ........ B01J 19/00; B01J 19/18; B01J 19/1806; B01J 2219/00049; B01J 2219/00164; B01D 45/00; B01D 45/12; B01D 45/14; B02C 13/00; B02C 13/02; B02C 13/04; B02C 13/26; B02C 13/288; B09B 3/00; C10J 3/00; C10J 3/02; C10J 3/20; C10J 3/34; C10J 3/40; C10J 3/42; C10J 3/72; C10J 3/74; C10J 2300/00; C10J 2300/09–2300/0906; C10J 2300/0913–2300/092; C10J 2300/0946
See application file for complete search history.

(56) References Cited

U.S. PATENT DOCUMENTS

| | | |
|---|---|---|
| 3,894,695 A | 7/1975 | Benedikter |
| 5,240,188 A | 8/1993 | Whitmire |

(Continued)

FOREIGN PATENT DOCUMENTS

| | | |
|---|---|---|
| CN | 102753261 A | 10/2012 |
| DE | 4445441 A1 | 6/1996 |

(Continued)

OTHER PUBLICATIONS

European Patent Office, Extended European Search Report from European Patent Application No. 13866440.4-1352/2934742, dated Nov. 19, 2015 (total 7 pgs.).

(Continued)

*Primary Examiner* — Natasha Young
(74) *Attorney, Agent, or Firm* — Barclay Damon, LLP

(57) ABSTRACT

A reactor having at least one reaction chamber and rotor, the reaction chamber having at least one sealed housing with at least one inlet and outlet opening. The rotor has at least one shaft with at least a first part in the housing the shaft extending from the first part through the housing, the first part of the rotor having at least one hammer At least one fan blade is positioned on the shaft near an outlet opening in the reaction chamber. The outlet opening is situated near at least one shaft seal and on the shaft between the reaction chamber and surroundings. The fan blade is situated between the shaft seal and central part of the reactor The shaft extends in one direction from the first part through the housing and the fan blade being an axial distance from the hammer on the first part of the rotor.

26 Claims, 3 Drawing Sheets

(51) Int. Cl.
*B02C 13/04* (2006.01)
*B02C 13/288* (2006.01)
*C10J 3/02* (2006.01)
*C10J 3/20* (2006.01)
*C10J 3/34* (2006.01)
*C10J 3/40* (2006.01)
*C10J 3/72* (2006.01)
*C10J 3/74* (2006.01)

(52) U.S. Cl.
CPC ............... *B02C 13/288* (2013.01); *C10J 3/42*
(2013.01); *B01J 2219/00164* (2013.01); *C10J 2300/092* (2013.01); *C10J 2300/0906* (2013.01); *C10J 2300/0946* (2013.01)

(56) References Cited

U.S. PATENT DOCUMENTS

2009/0230224 A1* 9/2009 Eriksen .................. B02C 13/12
241/19
2012/0321531 A1 12/2012 Olsson

FOREIGN PATENT DOCUMENTS

| DK | 159056 B | 8/1990 |
|----|----------|--------|
| SE | 534399 C2 | 8/2011 |
| WO | WO2008-000273 A1 | 1/2008 |
| WO | WO2011-078779 A1 | 6/2011 |

OTHER PUBLICATIONS

Juriga, Mad'Ar and M., "A New Method of the Organic Waste Treatment, Concerning Waste Oil, Mixed Plastics Waste, Oil Sludge and PCBS Waste Processing with Simultaneous Recovery of Hydrocarbons", XP003029647, Petroleum and Coal, vol. 45, 3-4, 187-192, 2003 (total 6 pgs.).

(ISA/SE) Swedish Patent and Registration Office, International Search Report of PCT/SE2013/051543 as completed Mar. 28, 2014 (total 4 pages).

State Intellectual Property Office (SIPO), Chinese Office Action from Chinese Patent Application No. 201380064725.0, dated Dec. 25, 2015 (total 10 pgs.).

* cited by examiner

REACTOR, METHOD OF DECREASING THE AMOUNT OF SOLID PARTICLES IN A GAS STREAM FROM A REACTOR AND USE OF THE REACTOR

CROSS REFERENCE TO RELATED APPLICATIONS

This application is a national phase application which is based upon PCT/SE2013/051543, now WO 2014/098747 filed Dec. 17, 2013, which claims priority to SE 1251493-1, filed on Dec. 21, 2012 and USSN 61/740,815, filed on 21 Dec. 2012. Each of these documents is incorporated by reference in their entirety.

The present invention concerns a reactor for the separation of material included in composite raw material and comprising at least one reaction chamber and at least one rotor, said reaction chamber comprising at least one housing which is sealed in relation to the surroundings and has at least one inlet opening and at least one outlet opening and said rotor comprising at least one shaft, and at least a first part of said rotor being situated in said housing and said shaft extending from said first part through and out of said housing, said first part of said rotor comprising at least one hammer. The present invention also concerns a method of decreasing the amount of solid particles accompanying a gas stream from a reactor, and use of the reactor.

PRIOR ART

SE, C2, 534 399 shows a reactor of the type described by way of introduction. At least a first part of the rotor is situated in the housing and the shaft extends in only one direction from said first part through and out of the housing. However, the construction is not optimum as regards providing conditions for a process having as small an impact on the surrounding environment as possible and having as efficient use of resources as possible.

SUMMARY OF THE INVENTION

A first object of the present invention is to provide a reactor that in operation has a smaller amount of solid particles accompanying a gas stream from the reactor than hitherto known reactors of a comparable type. A second object of the present invention is to provide a method of decreasing the amount of solid particles accompanying a gas stream from a reactor. A third object of the present invention is to provide a use of the reactor. Thus, the invention embraces a reactor for the separation of material included in composite raw material and comprising at least one reaction chamber and at least one rotor, said reaction chamber comprising at least one housing which is sealed in relation to the surroundings and has at least one inlet opening and at least one outlet opening and said rotor comprising at least one shaft, and at least a first part of said rotor being situated in said housing and said shaft extending from said first part through and out of said housing, said first part of said rotor comprising at least one hammer. The reactor has at least one fan blade which is positioned directly or indirectly on said shaft and situated near an outlet opening for gas of said at least one outlet opening in said reaction chamber, said outlet opening for gas being situated near at least one shaft seal, positioned directly or indirectly on said shaft, between said reaction chamber and the surroundings, said fan blade being situated between said shaft seal and the central part of the reactor, said fan blade being situated in an inlet, which is especially designed for the purpose and located in said reaction chamber, into said outlet opening for gas, said shaft extending in only one direction from said first part through and out of said housing, and said fan blade being situated at an axial distance from said hammer on said first part of said rotor.

Said fan blade may be situated in said reaction chamber. Said fan blade may be situated near said at least one outlet opening in said reaction chamber.

Said fan blade may be directed in such a way that it, when said shaft rotates, counteracts the direction of motion of the occurring gas stream out of the reactor, at which particles of solid material accompanying the gas stream are thrown back inward toward the central part of the reactor. Said fan blade may be directed in principally the same direction as an imaginary thread of an imaginary right-threaded screw which is thought to be situated in the centre of said shaft where the same passes said fan blade, and is thought to extend primarily parallel to said shaft and be intended to be screwed inward toward the central part of the reactor. In the operation of the reactor, said shaft may rotate counter-clockwise as seen from said fan blade and inward toward the central part of the reactor. Three fan blades, positioned directly or indirectly on said shaft, may be present.

At least one support device may together act on a part of said shaft situated outside said housing, alternatively on an additional shaft joined to said part, wherein said support device entirely may support the reactor. At least one support device may together act on a part of said shaft situated outside said housing, alternatively on an additional shaft joined to said part, wherein said support device partly may support the reactor. Said shaft may be mounted in bearings in at least two planes extending primarily perpendicular to a principal direction of extension of said shaft, and where said planes are situated outside said housing. Said support device may comprise at least one stand. Said support device may comprise at least two bearings for the bearing mounting of said shaft in said planes. Said support device may comprise at least one bearing housing.

Said housing may have a primarily cylindrical shape. Said housing may have at least one dismountable part. Said dismountable part may be attached to a remainder of said housing by screw joints and/or bolt joints. Said dismountable part may be internally provided with wear-resistant material.

The remainder of said housing may be attached to at least one of said at least one bearing housing and be supported entirely by this/these. The remainder of said housing may be attached to at least one of said at least one bearing housing and be supported partly by this/these. The remainder of said housing may be attached to at least one of said at least two bearings and be supported entirely by this/these. The remainder of said housing may be attached to at least one of said at least two bearings and be supported partly by this/these. The remainder of said housing may be attached to at least one of said at least one stand and be supported entirely by this/these. The remainder of said housing may be attached to at least one of said at least one stand and be supported partly by this/these.

At least one of said hammers may comprise at least one fixed part and at least one articulated part. Said fixed part may be fixedly attached to said first part of said rotor and said articulated part may be articulately attached to said fixed part. Said articulated part may have a centre of gravity which is lying on a first radius r1 of said rotor at the same time as an axis of rotation for the rotation between said articulated part and said fixed part is lying on a second radius r2 of said rotor, wherein said first radius r1 may be trailing said second radius r2 upon rotation of said rotor in connection with operation of the reactor.

Thus, the invention also embraces a method of decreasing the amount of solid particles accompanying a gas stream from a reactor for the separation of material included in composite raw material, which reactor comprises at least one reaction chamber and at least one rotor, said reaction chamber comprising at least one housing which is sealed in relation to the surroundings and has at least one inlet opening and at least one outlet opening and said rotor comprising at least one shaft, and at least a first part of said rotor being situated in said housing and said shaft extending from said first part through and out of said housing, said first part of said rotor comprising at least one hammer, the method comprising the steps of providing said shaft with a fan blade positioned directly or indirectly on said shaft placing said fan blade in an inlet, which is especially designed for the purpose and located in said reaction chamber, into an outlet opening for gas of said at least one outlet opening, placing said fan blade at an axial distance from said hammer on said first part of said rotor, and directing said fan blade so that it, when said shaft rotates, counteracts the direction of motion of the occurring gas stream out of the reactor, in which particles of solid material accompanying the gas stream are thrown back inward toward the central part of the reactor while the rest of the gas stream leaves the reactor through said outlet opening for gas.

Thus, the invention also embraces a use of the reactor according to the above for the separation of material included in composite raw material. The raw material may be tyres for cars and/or other vehicles. The raw material may be plastic. The raw material may be oil. The raw material may be nylon. The raw material may be polyester. The raw material may be digested sludge. The raw material may be wood. The raw material may be slaughterhouse waste. The raw material may be oil plants.

LIST OF FIGURES

DESCRIPTION OF EMBODIMENTS

Figure 1:
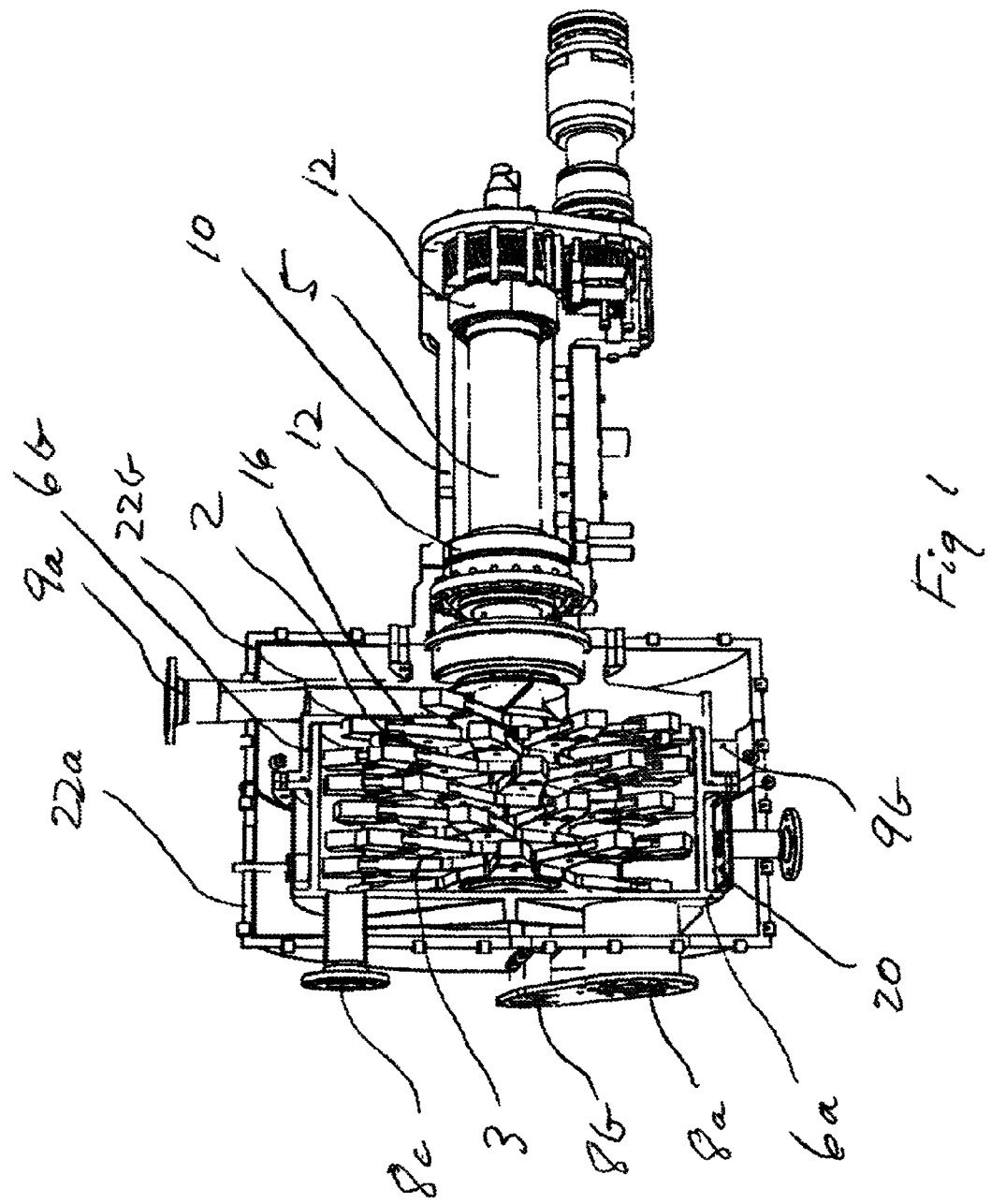
FIG. 1 shows, in a partly sectioned perspective view, a reactor according to the invention.
Figure 2:
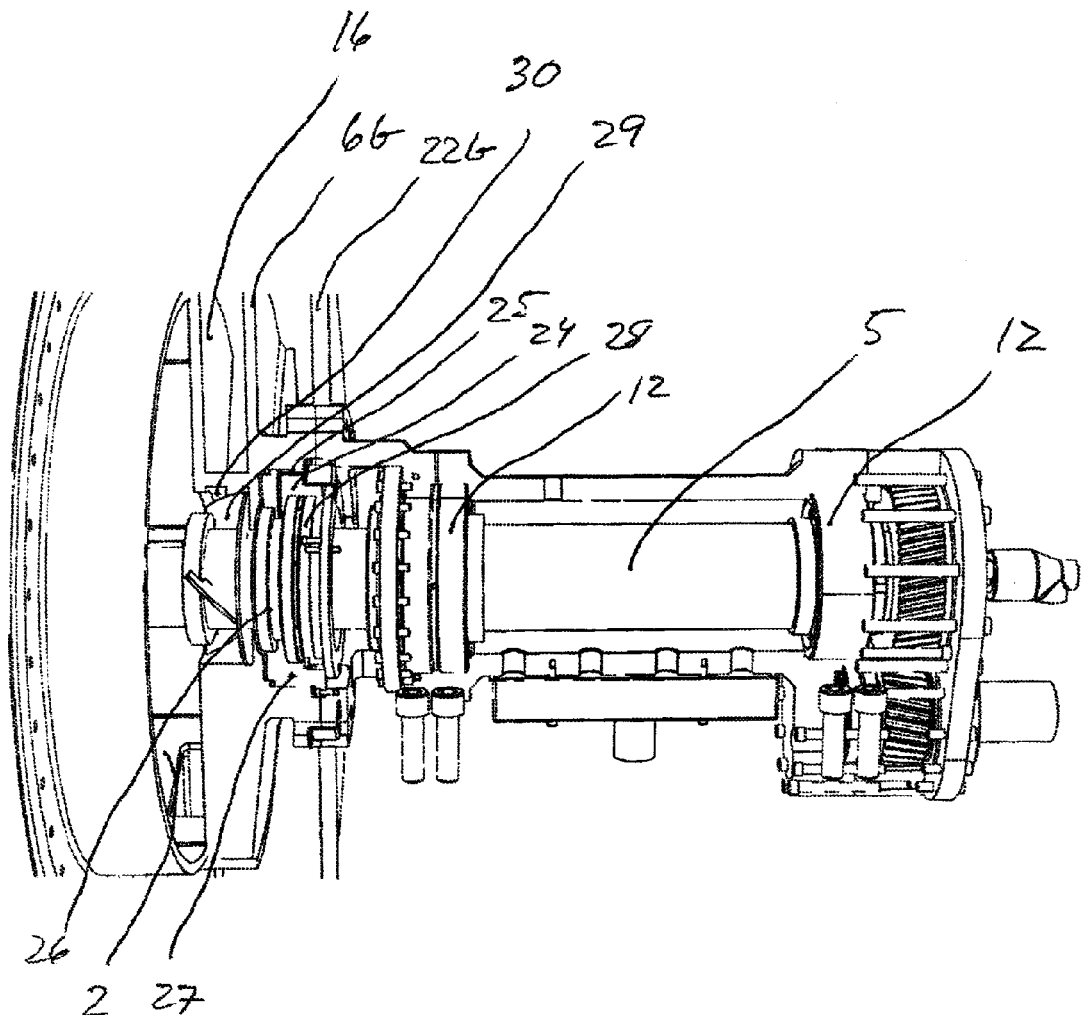
FIG. 2 shows, in a partly sectioned side view, a part of the reactor in FIG. 1.

In FIGS. 1 and 2, it is seen how a reactor according to the invention looks. The reactor 1 comprises a reaction chamber 2 and a rotor 3 which is positioned at least partly in the same and has hammers 4 mounted on a rotor shaft 5. The reaction chamber 2 is surrounded by a housing 6 consisting of two parts, viz. a first part 6a and a second part 6b. The first part 6a has one or more inlet openings 8a, 8b, 8c for raw material to the reactor and the second part 6b has one or more outlet openings 9a, 9b for products from the reactor. The housing 6, 6a, 6b is primarily cylindrical and the first part 6a as well as the second part 6b is provided with a mating circumferential flange having a first diameter for a common bolt joint.

In an analogous way, in a second end, the second part 6b connects to a bearing housing 10, the second part 6b as well as the bearing housing 10 being provided with a mating circumferential flange having a second diameter for a common bolt joint. The first diameter is greater than the second diameter. The bearing housing 10 is in turn supported by a stand (not shown) and accommodates two bearings 12 for the bearing mounting of the rotor shaft 5 where the same extends outside the reaction chamber 2, i.e., only on one side of the reaction chamber 2, the stand accordingly supporting the entire reactor 1.

A covering (not shown) of a wear-resistant material such as steel or ceramic material is present on the inside of the first part 6a. In the second part 6b, there is present an inner wall 16—primarily parallel to the primarily circular end surface of the second part 6b and at a certain distance from the same—and which allows gas to pass through the centre of said wall 16—i.e., between the wall 16 and the rotor shaft 5—to an inner/rear space in the reaction chamber 2 from where the gas can continue out of the reactor through an outlet opening 9a of said outlet openings 9a, 9b and further to an inlet channel of an eductor (not shown) or a distillation unit (not shown) or a condensation unit (not shown) or directly for combustion in an engine (not shown) or heating system (not shown). Three fan blades 29 are mounted on the shaft 5 and situated in a purpose-made inlet 30 into the outlet opening 9a for gas. The fan blades 29 are directed in such a way that they, when the shaft 5 rotates, counteract the direction of motion of the occurring gas stream out of the reactor 1, in which particles of solid material accompanying the gas stream are thrown back inward toward the central part of the reactor 1. Thus, the fan blades 29 are directed in principally the same direction as an imaginary thread of an imaginary right-threaded screw would be, which screw is thought to be situated in the centre of the shaft 5 where the same passes the fan blades 29, and is thought to extend primarily parallel to the shaft 5 and be intended to be screwed inward toward the central part of the reactor 1. In the operation of the reactor 1, the shaft 5 rotates counter-clockwise as seen from the fan blades 29 and inward toward the central part of the reactor 1. Also the opposite is possible, i.e., that the shaft 5 in the operation of the reactor 1 rotates clockwise as seen from the fan blades 29 and inward toward the central part of the reactor 1, but if so, the fan blades 29 should be directed in principally the same direction as an imaginary thread of an imaginary left-threaded screw would be, which screw is thought to be situated in the centre of the shaft 5 where the same passes the fan blades 29, and is thought to extend primarily parallel to the shaft 5 and be intended to be screwed inward toward the central part of the reactor 1.

Solid particles may leave the reactor through another outlet opening 9b of said outlet openings 9a, 9b. The reaction chamber 2 is, apart from occurring inlet openings 8a, 8b, 8c, outlet openings 9a, 9b, and a shaft seal 24 at a shaft bushing for the rotor shaft 5, separated from the surroundings, i.e., the housing 6, 6a, 6b and occurring connection to said bearing housing 10 are in other respects to be considered as primarily gas-tight in relation to the surroundings. In this way, the reaction chamber 2 and the reactor 1 differ from usual hammer mills which are more or less open toward the surroundings. The fan blades 29 are situated between the shaft seal 24 and the central part of the reactor 1.

Said shaft seal 24 comprises a fluid channel 25 which, in a first end, is connected to a fluid source (not shown) which provides an inert gas in the form of nitrogen gas or another inert gas. In a second end, the fluid channel 25 is in hydraulic communication with the reaction chamber 2 and is at least partly in the form of a gap located between a first part 26 rotating in the operation of the reactor 1 and a second part 27 non-rotating in the operation of the reactor 1. The first part 26 is here located directly on the shaft 5 and the second part 27 is located radially and axially next to the first part 26. It is, however, fully feasible to have one or more additional parts (not shown) between the first part 26 and the shaft 5. It is also fully feasible to let the first part 26 consist of the proper shaft 5 and with the second part 27 located radially and/or axially next to the shaft 5. The gap is of the labyrinth type. The shaft seal 24 also comprises two gaskets 28 of conventional type in the form of two graphite packings 28. The gap is located between the reaction chamber 2 and the graphite packings 28.

The supplied nitrogen gas maintains a pressure which exceeds the pressure that prevails in the reaction chamber 2 in the operation of the reactor 1, which results in a smaller amount of nitrogen gas continuously passing into the reaction chamber 2 in the operation of the reactor 1. This in turn guarantees that no environmentally detrimental gases penetrate out from the reaction chamber 2 in the operation of the reactor 1. The smaller amount of nitrogen gas which continuously passes into the reaction chamber 2 has no negative influence on the separation process in the reactor. The penetrating amount of nitrogen gas can be estimated by the formula $$q=1.5\times 10^{-4}\times uF(p1/T^{(1/2)}\times (p2/p1)^{(1/1.4)}\times (((1-(p2/p1)^{(1/3.5)}))^{0.5})$$

wherein q=penetrating amount of nitrogen gas (kg/h)
   x=multiplication sign
   ^=sign of exponent of power
   u=a constant which is between 0.62 and 0.98
   F=gap area (mm$^2$)
   p1=nitrogen gas pressure (bar)
   T=temperature (K)
   p2=back-pressure in the reaction chamber 2 (bar)

EXAMPLE

If an inner diameter of the second part 27 in the form of an outer ring 27 is 200.2 mm and an outer diameter of the first part 26 in the form of an inner ring 26 is 200.0 mm, F=62.83 is obtained. If u=0.75, p1=1.51, p2=1.50 and T=273, q=6.96 is obtained.

The housing 6, 6a, 6b is in heat exchanging contact with a channel 20 intended to convey gas for heat exchange between the gas and the housing 6, 6a, 6b. The channel 20 surrounds the greater part of the cylindrical outer surface—however not the primarily circular end surface—of the first part 6a of the housing 6, 6a, 6b, an inlet opening for the heat exchanging gas being present in a lower part of the channel 20 and an outlet opening (not shown) for the heat exchanging gas being present in an upper part of the channel 20. It is feasible to correspondingly let the channel 20 entirely or partly surround also the end surface of the first part 6a of the housing 6, 6a, 6b. It is feasible to correspondingly let the channel 20 entirely or partly surround also one or more of the inlet openings 8a, 8b, 8c for the raw material—however primarily the inlet opening 8a for the raw material in the form of tyres and/or plastic and/or oil and/or nylon and/or polyester and/or digested sludge and/or wood and/or slaughterhouse waste and/or oil plants and/or the like and the inlet opening 8b for sand and/or catalyst and/or the like.

An extra casing 22, 22a, 22b is present around the housing 6, 6a, 6b, also this for practical reasons being divided into a first part 22a and a second part 22b. The casing 22, 22a, 22b is primarily cylindrical and the first part 22a as well as the second part 22b is provided with a mating circumferential flange having a third diameter for a common mechanical joint. The third diameter is greater than the first diameter. Supporting stays (not shown) are present between the casing 22, 22a, 22b and the housing 6, 6a, 6b. In the space between the casing 22, 22a, 22b and the housing 6, 6a, 6b, there is insulating material. The casing 22, 22a, 22b is made from stainless steel but also other suitable metals and/or materials may occur.

Figure 3:
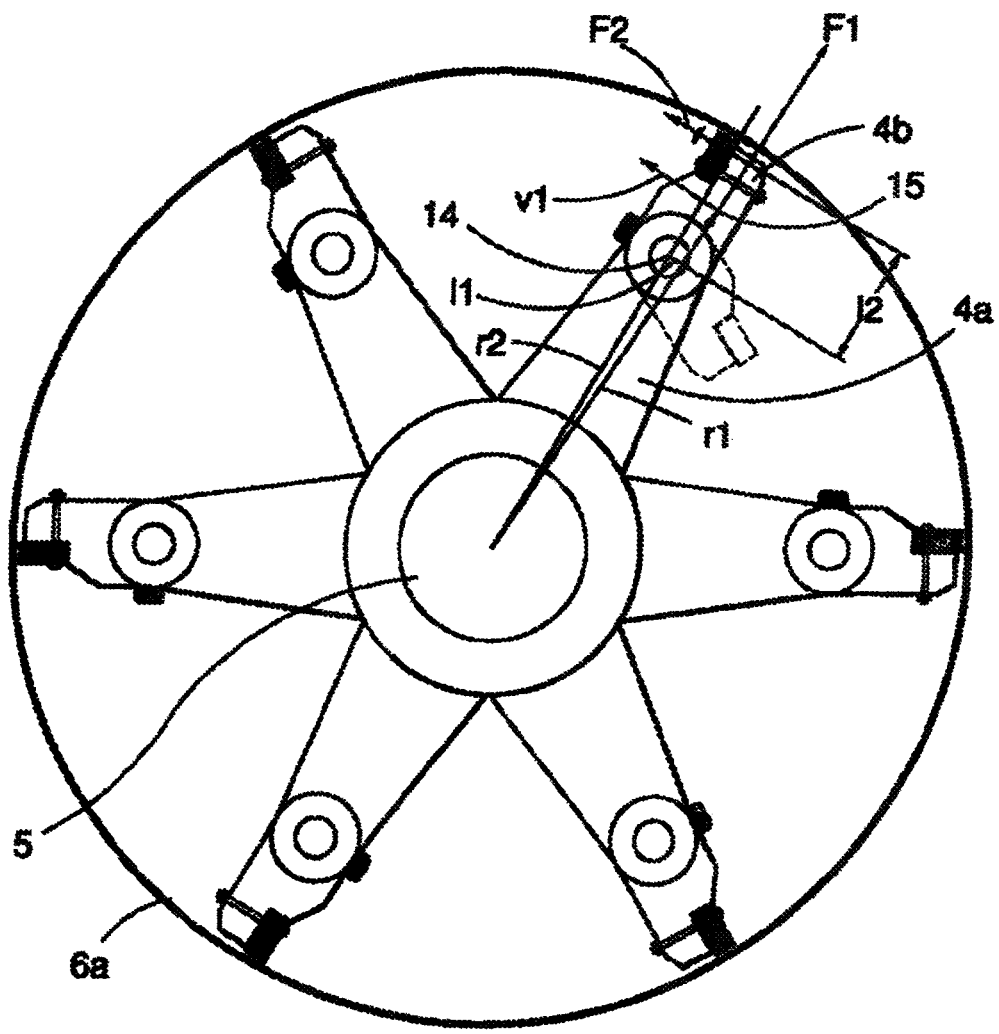
FIG. 3 shows, in a partly sectioned front view, a housing and a part of a rotor which may be included in the reactor in FIG. 1.

The rotor 3 in FIGS. 1 and 2 has hammers 4 of simpler type. In FIG. 3, it is seen how a part of an alternative rotor 3 may look. Here, the rotor shaft 5 is in the same plane provided with six hammers 4 but the number of hammers in the same plane may vary, each hammer 4 consisting of a fixed part 4a and an articulated part 4b. The articulated part 4b is pivoted around an axis 14 which extends primarily parallel to the principal direction of extension of the rotor shaft 5. When the rotor 3 rotates—anti-clockwise in the figure—the articulated part 4b has a centre of gravity 15 which is lying on a first radius r1 of said rotor at the same time as the axis 14 for the rotation between the articulated part 4b and the fixed part 4a is lying on a second radius r2 of said rotor, said first radius r1 trailing said second radius r2 in the rotation, i.e., said first radius r1 forming an angle with said second radius r2. For each hammer, in the direction of rotation, then a force F2 arises which is proportional to
   a mass m of said articulated part 4b of the hammer,
   a perpendicular distance l1 between said first radius r1 and said axis of rotation 14, and
   a speed of rotation v1 squared of said centre of gravity 15, as well as inversely proportional to
   an effective length l2 of the hammer, and
   a radius r1 from the centre of said rotor to said centre of gravity 15.

By the effective length l2 of the hammer, reference is made to a perpendicular distance between the force F2 and said axis of rotation 14. The force F2 attacks in the central point (the centre of mass) of the material that is accumulated on the hammer and against which the force F2 is to work.

Thus, a desired power per hammer can be calculated and set by predetermining the parameters listed above. Occurring torque will hold each hammer in the predetermined place—against a stop for each hammer (not shown)—by the determined force F2, and if it is exceeded because of too much material being fed into the reactor or because of some heavier impurity having entered into the reactor, the articulated part 4b bends rearward and lets the material pass until equilibrium of forces arises again. This function provides a levelling effect during normal operation and protection against breakdown if, for instance, foreign objects should accompany the material to be processed.

In use of the reactor, raw material is brought in through one or more of occurring inlet openings 8a, 8b, 8c into the reaction chamber 2 where it is decomposed, by the kinetic energy of the hammers 4 of the rotor, as well as by the kinetic energy of particles which are thrown around by the rotary motion of the rotor and by the heat energy that is created by friction between the hammers 4 and parts of the raw material. Inorganic material in the form of sand, catalysts, steel, glass, etc., may be used to increase the friction and thereby the temperature. The inorganic particles affect the decomposition process favourably by the fact that they have a large total contact surface which acts as an efficient heat exchanger against the raw material, as well as a catalyst for the breaking of hydrocarbon polymers and greater hydrocarbon molecules. Hydrocarbon compounds, water, and other organic material are gasified in the device. The centrifugal forces created by the rotor separate the gas from the heavier inorganic materials, the gas part being brought out of the reactor in the centre thereof and the heavier particles can be tapped at the periphery of the reactor and in both cases through occurring outlet openings 9a, 9b.

In use of the reactor, a method is applied of decreasing the amount of solid particles which accompanies the gas stream from the reactor, the method comprising the steps of
- providing the shaft 5 with a fan blade 29 positioned directly or indirectly on the shaft 5,
- placing the fan blade 29 in an inlet 30, which is especially designed for the purpose and located in the reaction chamber 2, into an outlet opening 9*a* for gas,
- placing the fan blade 29 at an axial distance from a hammer 4 on a first part of the rotor 3, and
- directing the fan blade 29 so that it, when the shaft 5 rotates, counteracts the direction of motion of the occurring gas stream out of the reactor 1, in which particles of solid material accompanying the gas stream are thrown back inward toward the central part of the reactor 1 while the rest of the gas stream leaves the reactor 1 through the outlet opening 9*a* for gas.

In use of the reactor, there is furthermore applied a method of decreasing leakage of environmentally detrimental gases from the reactor and decreasing in-leakage of gases detrimental to the process in the reactor, the method comprising the steps of
- providing the shaft 5 with a shaft seal, positioned directly or indirectly on the shaft 5, between the reaction chamber 2 and the surroundings, the shaft seal comprising a fluid channel,
- connecting the fluid channel in a first end to a fluid source which provides an inert gas,
- connecting the fluid channel in a second end to the reaction chamber 2, and
- arranging so that the inert gas maintains a pressure which exceeds the pressure that prevails in the reaction chamber 2 in the operation of the reactor 1. The inert gas is nitrogen gas or another inert gas. The fluid channel is at least partly in the form of a gap located between a first part rotating in the operation of the reactor 1 and a second part non-rotating in the operation of the reactor 1. The shaft seal also comprises two gaskets of conventional type in the form of two graphite packings. The gap is located between the reaction chamber 2 and the graphite packings.

The structure of the reactor according to the invention allows operation having less negative impact on the surrounding environment and having more efficient use of resources than what applies to previously known reactors of the corresponding type.

The invention is not limited to the embodiments shown herein, but may be varied within the scope of the subsequent claims.

The invention claimed is:

1. A reactor for the separation of material included in composite raw material, said reactor comprising:
   at least one reaction chamber; and
   at least one rotor, said reaction chamber comprising:
      at least one housing which is sealed in relation to the surroundings, said housing having at least one inlet opening and at least one outlet opening,
   and said rotor comprising:
      at least one shaft, at least a first part of said rotor being situated in said housing and said shaft extending from said first part through and out of said housing, said first part of said rotor comprising at least one hammer; and
      at least one fan blade which is positioned directly or indirectly on said shaft and situated near an outlet opening for gas of said at least one outlet opening in said reaction chamber, said outlet opening for gas being situated near at least one shaft seal, positioned directly or indirectly on said shaft, between said reaction chamber and the surroundings, said fan blade being situated between said shaft seal and the central part of the reactor, said fan blade being situated in an inlet, which is especially designed for the purpose and located in said reaction chamber, into said outlet opening for gas, said shaft extending in only one direction from said first part through and out of said housing, and said fan blade being situated at an axial distance from said hammer on said first part of said rotor.

2. The reactor according to claim 1, wherein said fan blade is situated in said reaction chamber.

3. The reactor according to claim 1, wherein said fan blade is situated near said at least one outlet opening in said reaction chamber.

4. The reactor according to claim 1, wherein said fan blade is directed so that the fan blade, when the shaft rotates, counteracts the direction of motion of the occurring gas stream out of the reactor, at which particles of solid material accompanying the gas stream are thrown back inward toward the central part of the reactor.

5. The reactor according to claim 1, wherein said fan blade is directed in principally the same direction as an imaginary thread of an imaginary right-threaded screw which is thought to be situated in the centre of said shaft where the same passes said fan blade, and is thought to extend primarily parallel to said shaft and be intended to be screwed inward toward the central part of the reactor.

6. The reactor according to claim 1, wherein said shaft in the operation of the reactor rotates counter-clockwise as seen from said fan blade and inward toward the central part of the reactor.

7. The reactor according to claim 1, comprising three said fan blades, positioned directly or indirectly on said shaft.

8. The reactor according to claim 1, wherein at least one support device together acts on a part of said shaft situated outside said housing, the at least one support device at least partly supporting the reactor.

9. The reactor according to claim 8, wherein the at least one support device acts on an additional shaft joined to said part of the shaft situated outside of the housing.

10. The reactor according to claim 8, wherein said at least one support device comprises at least one stand.

11. The reactor according to claim 10, wherein the remainder of said housing is attached to at least one of said at least one stand and is at least partly supported thereby.

12. The reactor according to claim 1, wherein the shaft is mounted in bearings in at least two planes extending primarily perpendicular to a principal direction of extension of the shaft, and where said planes are situated outside said housing.

13. The reactor according to claim 12, wherein at least one support device comprises at least two bearings for the bearing mounting of said shaft in said planes.

14. The reactor according to claim 13, wherein the remainder of said housing is attached to at least one of said at least two bearings and is at least partly supported thereby.

15. The reactor according to claim 8, wherein said at least one support device comprises at least one bearing housing.

16. The reactor according to claim 15, wherein the remainder of the housing is attached to at least one of said at least one bearing housing and is at least partly supported thereby.

17. The reactor according to claim 1, wherein said housing has primarily a cylindrical shape.

18. The reactor according to claim 1, wherein said housing has at least one dismountable part.

19. The reactor according to claim 18, wherein said dismountable part is attached to a remainder of said housing by at least one of screw joints or bolt joints.

20. The reactor according to claim 18, wherein said dismountable part is internally provided with wear-resistant material.

21. The reactor according to claim 1, wherein at least one of said at least one hammer comprises at least one fixed part and at least one articulated part.

22. The reactor according to claim 21, wherein the fixed part is fixedly attached to the first part of the rotor and the articulated part is articulately attached to the fixed part.

23. The reactor according to claim 22, wherein the articulated part has a center of gravity which is lying on a first radius (r1) of said rotor at the same time as an axis of rotation for the rotation between said articulated part and said fixed part is lying on a second radius (r2) of said rotor, said first radius (r1) trailing said second radius (r2) upon rotation of said rotor in connection with operation of the reactor.

24. A method of decreasing the amount of solid particles accompanying a gas stream from a reactor for the separation of material included in composite raw material, which reactor comprises at least one reaction chamber and at least one rotor, said reaction chamber comprising at least one housing which is sealed in relation to the surroundings and has at least one inlet opening and at least one outlet opening and said rotor comprising at least one shaft, and at least a first part of said rotor being situated in said housing and said shaft extending from said first part through and out of said housing, said first part of said rotor comprising at least one hammer, the method comprising the steps of:

providing the shaft with a fan blade positioned directly or indirectly on said shaft;

placing said fan blade in an inlet, which is especially designed for the purpose and located in said reaction chamber, into an outlet opening for gas of said at least one outlet opening;

placing said fan blade at an axial distance from said hammer on said first part of said rotor; and directing said fan blade in such a way that it, when said shaft rotates, counteracts the direction of motion of the occurring gas stream out of the reactor, at which particles of solid material accompanying the gas stream are thrown back inward toward the central part of the reactor while the rest of the gas stream leaves the reactor through said outlet opening for gas.

25. The method according to claim 24, wherein the raw material consists of tires for vehicles.

26. The method according to claim 24, wherein the raw material consists from at least one of the group consisting of plastic, oil, oil plants, nylon, polyester, digested sludge, wood, and slaughterhouse waste.

* * * * *